US010812431B2

(12) United States Patent
Quirarte et al.

(10) Patent No.: US 10,812,431 B2
(45) Date of Patent: *Oct. 20, 2020

(54) SOCIAL PLATFORM FOR EVENT CREATION AND COMMUNICATION AND METHOD THEREFOR

(71) Applicant: CHAT-ME-IN, Scottsdale, AZ (US)

(72) Inventors: Paula N. Quirarte, Scottsdale, AZ (US); Humberto A. Quirarte, III, Scottsdale, AZ (US)

(73) Assignee: CHAT-ME-IN, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,355

(22) Filed: May 10, 2019

(65) Prior Publication Data

US 2019/0334846 A1    Oct. 31, 2019

Related U.S. Application Data

(63) Continuation of application No. 15/077,669, filed on Mar. 22, 2016, now Pat. No. 10,356,021.

(51) Int. Cl.
*G06F 3/048* (2013.01)
*H04L 12/58* (2006.01)

(52) U.S. Cl.
CPC ............ *H04L 51/10* (2013.01); *H04L 51/046* (2013.01); *H04L 51/08* (2013.01); *H04L 51/24* (2013.01); *H04L 51/32* (2013.01)

(58) Field of Classification Search
None
See application file for complete search history.

(56) References Cited

U.S. PATENT DOCUMENTS

| | | | | |
|---|---|---|---|---|
| 9,058,595 B2* | 6/2015 | Coffman | ............... | G06Q 10/109 |
| 2013/0086501 A1* | 4/2013 | Chow | ................. | G06F 16/2477 |
| | | | | 715/772 |
| 2013/0326221 A1* | 12/2013 | Murphy | ................ | H04L 63/123 |
| | | | | 713/168 |
| 2016/0134583 A1* | 5/2016 | Kumar | ................. | H04L 51/043 |
| | | | | 709/206 |
| 2017/0083590 A1* | 3/2017 | Jagarlamudi | ......... | G06F 16/335 |
| 2017/0093994 A1* | 3/2017 | Tateno | ................... | G06Q 50/01 |

* cited by examiner

*Primary Examiner* — Thanh T Vu
(74) *Attorney, Agent, or Firm* — Weiss & Moy, P.C.; Jeffrey D. Moy

(57) ABSTRACT

A method of event creation and communication comprising: sending an invitation to an event by an individual; displaying the invitation on an event page of the individual, wherein the invitation appears as a bubble on the event page of the individual, information on the event displayed within the bubble; and illuminating a perimeter of the bubble at a predetermined timeframe prior to the event.

19 Claims, 14 Drawing Sheets

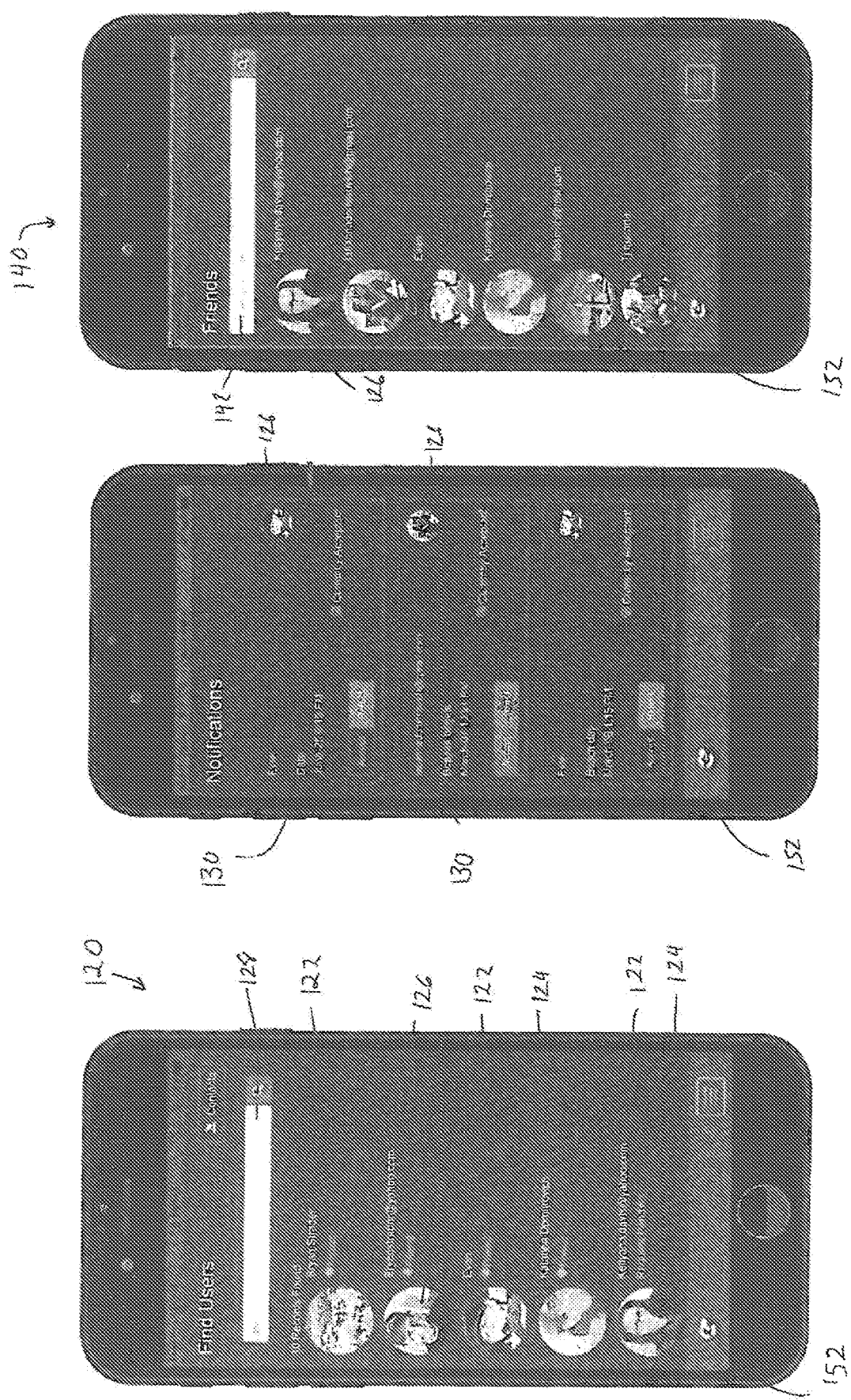

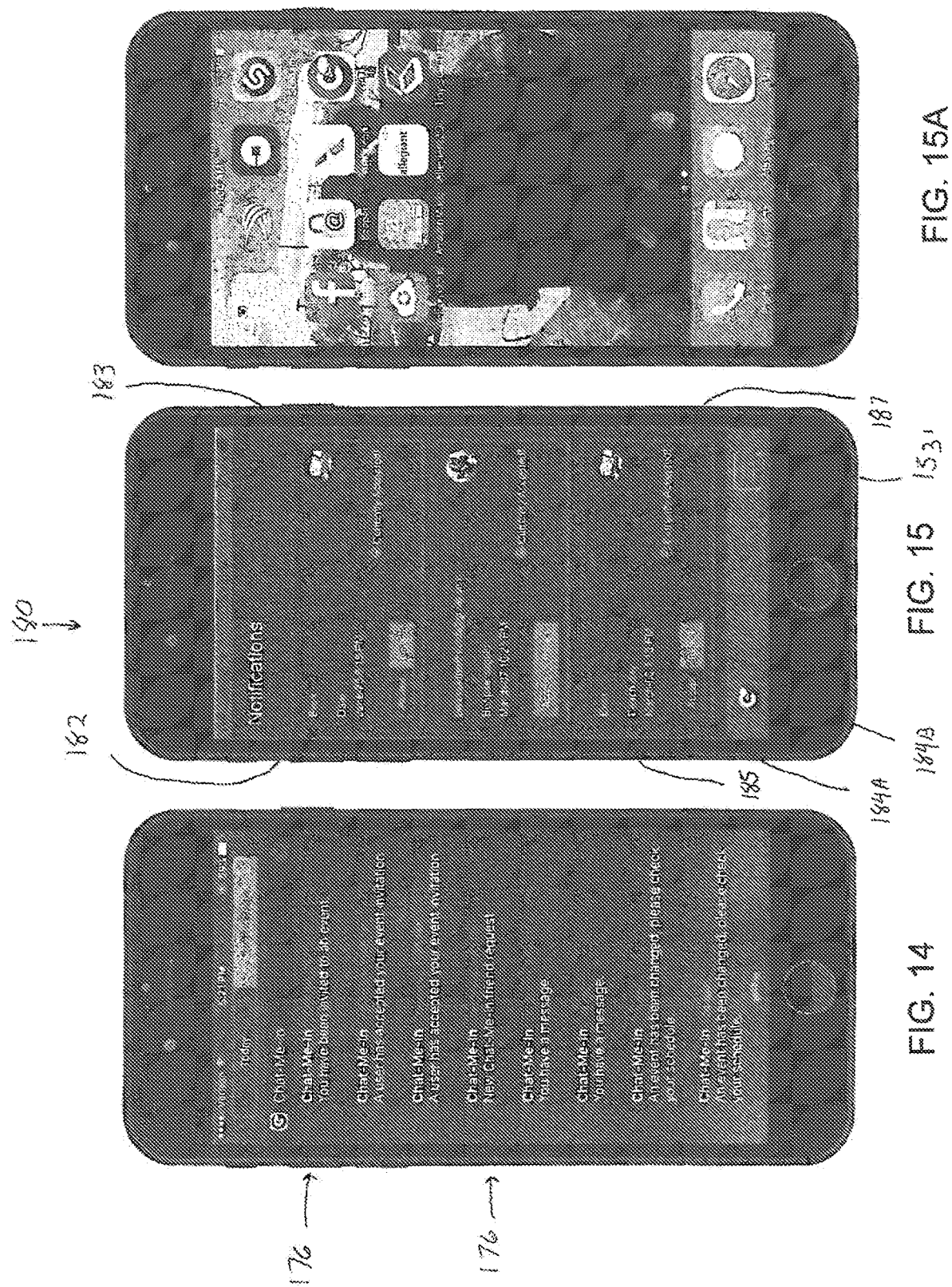

SOCIAL PLATFORM FOR EVENT CREATION AND COMMUNICATION AND METHOD THEREFOR

FIELD

The present application generally relates to an event creation application, and, more particularly, to an event creation application that allows for private and group communication and visual and/or textual summaries of past events.

BACKGROUND

Many electronic devices, such as, computers, tablets, cellular telephones and other similar electronic devices may have a calendar application. The calendar applications may permit the users of the electronic devices to schedule events in the electronic calendar of a particular device and receive reminders of these upcoming events. Such calendar applications may be useful in providing reminders to the users of upcoming events such as meetings, project due dates, birthdays, holidays, social gatherings or other types of events.

While these calendar applications allow for simple scheduling of events and reminder notifications, most calendar applications lack functionality. The user interface of most calendar applications may be set to mimic old day planners, failing to take advantage of the dynamic digital interface that is available on their electronic device. Further, most calendar applications are unable to communicate with other calendar applications. Thus, if an invite to an event is sent to another party, one has no way of knowing if the invites are busy during the time of the event and if they plan on attending. Most calendar applications also do not all allow sharing of information or communication among participants.

Therefore, it would be desirable to provide a system and method that overcome the above identified concerns, as well as additional challenges which will become apparent from the disclosure set forth below.

SUMMARY

This summary is provided to introduce a selection of concepts in a simplified form mat are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a method of event creation and communication is disclosed. The method comprising: sending an invitation to an event by an individual; displaying the invitation on an event page of the individual, wherein the invitation appears as a bubble on the event page of the individual, information on the event displayed within the bubble; and illuminating a perimeter of the bubble at a predetermined timeframe prior to the event.

In accordance with one aspect of the present application, a computing device is disclosed. The computing device has a processor. A display is coupled to the processor. A user interface is coupled to the processor for entering data into the computing device. A memory is coupled to the processor. The memory stores program instructions that when executed by the processor, causes the processor to: connect with a server hosting a social platform for event creation and communication; create an invitation by an individual of the computing device to an event through the social platform; attach one of a photo, video or text file to the invitation; send the invitation to at least one invitee; display the invitation on an event page of the individual and the at least one invitee, wherein the invitation appears as a bubble on the event page of the individual and the at least one invitee, information on the event displayed within the bubble; display a notification page of the at least one invitee, the notification page displaying all invitations received and sent by the at least one invitee, wherein each invitation displayed on the notification page has a status indicator showing if the at least one invitee has accepted, rejected or has not responded to the invitation; send a reminder of the event, the reminder appearing as a reminder bubble attached to the bubble on the event page of the individual and the at least one invitee; illuminate a perimeter of the bubble at a predetermined timeframe prior to the event; display all events for a current day in chronological order on an event page of the individual and an event page of the at least one invitee, wherein the individual and the at least one invitee are able to scroll through all the events when a plurality of events are displayed; and display all events over a predetermined timeframe on a timeline page of the individual and a timeline page of the at least one invitee, wherein the individual and the at least one invitee are able to scroll through all the events when a plurality of events are displayed

BRIEF DESCRIPTION OF THE DRAWINGS

Embodiments of the disclosure will become more fully understood from the detailed description and the accompanying drawings, wherein:

FIG. 8 shows a contact search page which may be displayed on the computing device used in FIG. 1 in accordance with one embodiment of the present invention;

FIG. 9 shows an invitation to join page which may be displayed on the computing device used in FIG. 1 in accordance with one embodiment of the present invention;

FIG. 10 shows a "Network or Friends List" page which may be displayed on the computing device used in FIG. 1 in accordance with one embodiment of the present invention;

FIG. 14 shows a notification that may be displayed on the computing device used in FIG. 1 in accordance with one embodiment of the present invention;

FIG. 15 shows a personal notification page which may be displayed on the computing device used in FIG. 1 in accordance with one embodiment of the present invention;

FIG. 15A shows a number of notifications that may be displayed on an APP page of the computing device used in FIG. 1 in accordance with one embodiment of the present invention;

DESCRIPTION OF THE INVENTION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
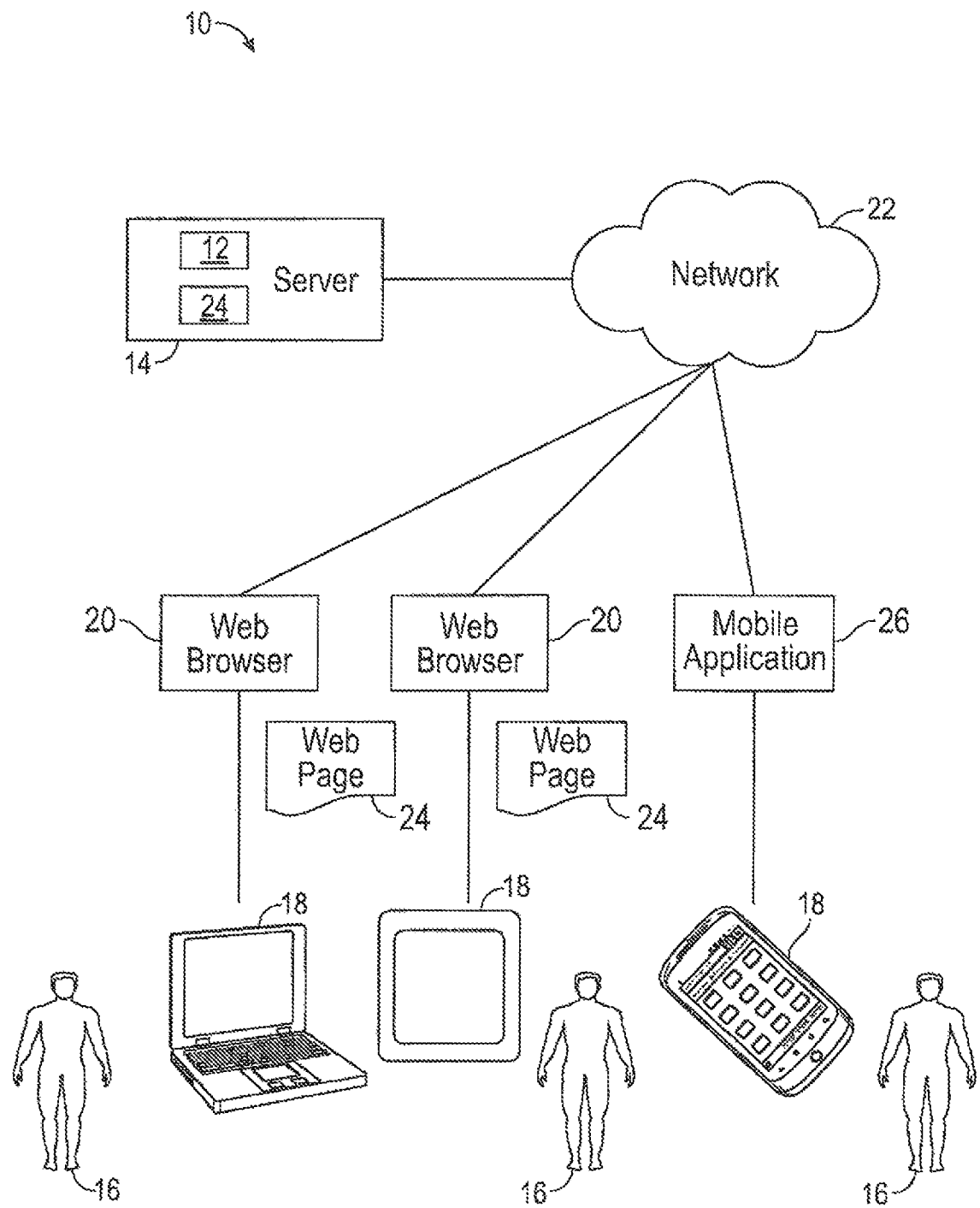
FIG. 1 is a block diagram of a social network system for event planning and communication in accordance with one embodiment of the present invention.

Referring now to FIG. 1, a system 10 may be shown. The system 10 may provide a social network platform 12 that may allow for event creation, private and group communication between invitees to the event created, visual and/or textual summaries of past events individuals using the network have attended, as well as other features that may be described below. The system 10 may have a server 14. The server 14 may be used to host the social platform 12 of the present invention. Individuals 16 may use one or more computing devices 18 to access the social platform 12 that may be hosted on the server 14. The computing devices 18 may be a personal computer system, tablet device, handheld or laptop device, mobile phone device, server computer system, multiprocessor system, microprocessor-based system, set top boxes, programmable consumer electronics, network PCs, and distributed cloud computing environments that include any of the above systems or devices, and the like. The computing device 18 may be described in the general context of computer system executable instructions, such as program modules, being executed by a computer system as may be described below.

The computing device 18 may be loaded with an operating system. The operating system of the computing device 18 may manage hardware and software resources of the computing device 18 and provide common services for computer programs running on the computing device 18. The computing device 18 may be loaded with a web browser 20. The web browser 20 may allow the computing device 18 to gain online access to a network 22 such as the World Wide Web. The web browser 20 may be Microsoft® Internet Explorer, Google® Chrome, Mozilla® Firefox, Apple® Safari or similar browsing applications. By connecting to the network 22, the computing device 18 may access a website 24 associated with the social platform hosted on the server 14.

Alternatively, or in addition to, the computing device 18 may download a mobile application 26. The mobile application 26 may access and communicate with the social platform 12 hosted on the server 14. By connecting to the network 22, the computing device 18 may access and communicate with the social platform 12 hosted on the server 14 via the mobile application 26.

Figure 1A:
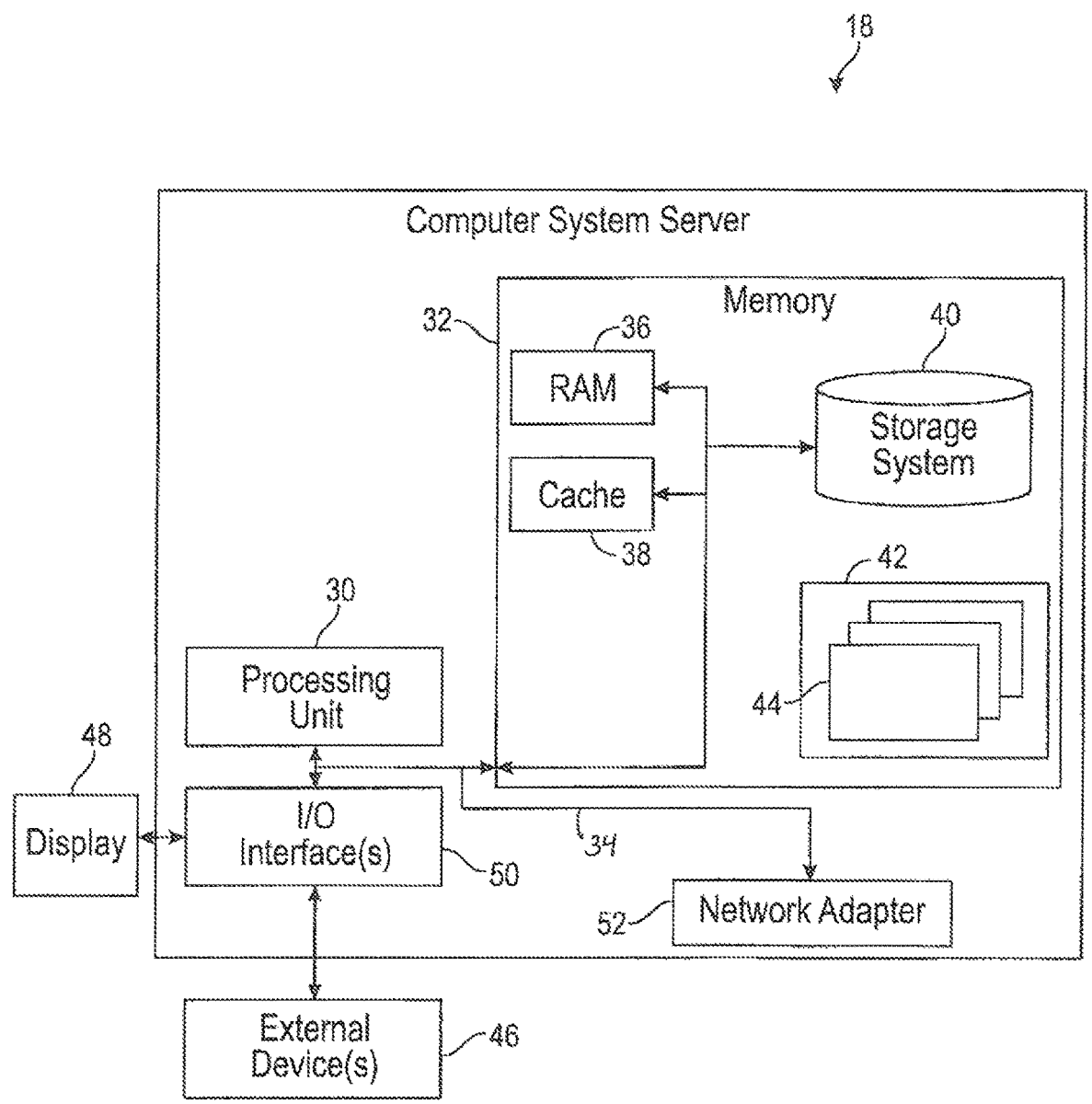
FIG. 1A is a block diagram of a computing device used in the social network system of FIG. 1 in accordance with one embodiment of the present invention.

Referring now to FIG. 1A, the computing devices 18 may be described in more detail in terms of the machine elements that provide functionality to the systems and methods disclosed herein. The components of the computing devices 18 may include, but are not limited to, one or more processors or processing units 30, a system memory 32, and a system bus 34 that couples various system components including the system memory 32 to the processor 30. The computing devices 18 may typically include a variety of computer system readable media. Such media could be chosen from any available media that is accessible by the computing devices 18, including non-transitory, volatile and non-volatile media, removable and non-removable media. The system memory 32 could include one or more computer system readable media in the form of volatile memory, such as a random access memory (RAM) 36 and/or a cache memory 38. By way of example only, a storage system 40 may be provided for reading from and writing to a non-removable, non-volatile magnetic media device typically called a "hard drive".

The system memory 32 may include at least one program product/utility 42 having a set (e.g., at least one) of program modules 44 that may be configured to carry out the functions of embodiments of the invention. The program modules 44 may include, but is not limited to, an operating system, one or more application programs, other program modules, and program data. Each of the operating systems, one or more application programs, other program modules, and program data or some combination thereof, may include an implementation of a networking environment. The program modules 44 generally carry out the functions and/or methodologies of embodiments of the invention as described herein. For example, the program modules 44 may carry out the steps for initiating an event creation, private and group communication between invitees to the event created, visual and/or textual summaries of past events of individuals and other functionality as will be described below.

The computing device 18 may communicate with one or more external devices 46 such as a keyboard, a pointing device, a display 48, and/or any similar devices (e.g., network card, modem, etc.) that enable the computing device 18 to communicate with the server 14 (FIG. 1). Such communication may occur via Input/Output (I/O) interfaces 50. Alternatively, the computing devices 18 may communicate with one or more networks such as a local area network (LAN), a general wide area network (WAN), and/or a public network (e.g., the network 24 shown in FIG. 1) via a network adapter 52. As depicted, the network adapter 52 may communicate with the other components of the computing device 18 via the bus 36.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 40) may be utilized. In the context of this disclosure, a computer readable storage medium may be any tangible or non-transitory medium that can contain, or store a program (for example, the program product 42) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 2:
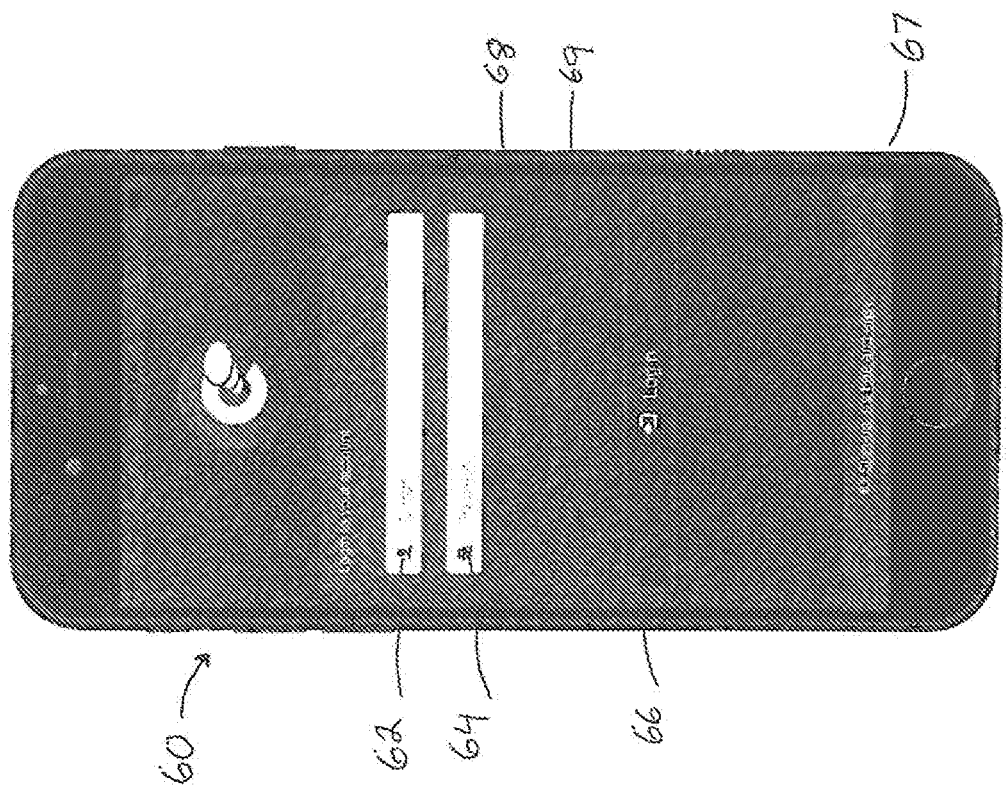
FIG. 2 shows a login screen which may be displayed on the computing device used in FIG. 1 in accordance with one embodiment of the present invention.

Referring to the FIGS., one embodiment of operation of the social network platform 12 may be described. To access the social network platform 12, individuals 16 may access the webpage 24 or download the mobile application 26 via a computing device 18 of the individual 16. The mobile application 26 may be downloaded from iTunes®, Google Play®, Apotide® or other similar mobile application download sites. Once the individual 16 accesses the webpage 24 or opens the mobile application 26, the individual 16 may see a login screen 60 as shown in FIG. 2. The login screen 60 may have a User ID area 62 and a password area 64.

Once the individual 16 enters the corresponding user information in the User ID area 62 and the password area 64, the individual 16 may press the Login button 66 using an external device 46 (i.e. keyboard, mouse, etc) of the computing device 18 of the individual 16. The user information may be sent to the server 14 hosting the social network platform 12 for verification. If the user information of the individual 16 is verified, the individual 16 may be sent to a personalized profile page 100 shown in FIG. 6 of the individual 16 which may be described below. A link 68 may be provided if the individual 16 cannot remember his/her User ID/password. By selecting the link 68 using an external device 46 of the computing device 18 of the individual 16, the individual 16 may be sent to reset password page 80 shown in FIG. 4. The login screen 60 may have a link 69 to review the terms and conditions of signing up and accessing the social network platform 12. Selecting the link 69 using an external device 46 of the computing device 18 of the individual 16 may send the individual 16 to a terms and condition page outlining the legal arrangement between the owners of the social network platform 12 and the individual 16 joining/accessing the social network platform 12.

Figure 6:
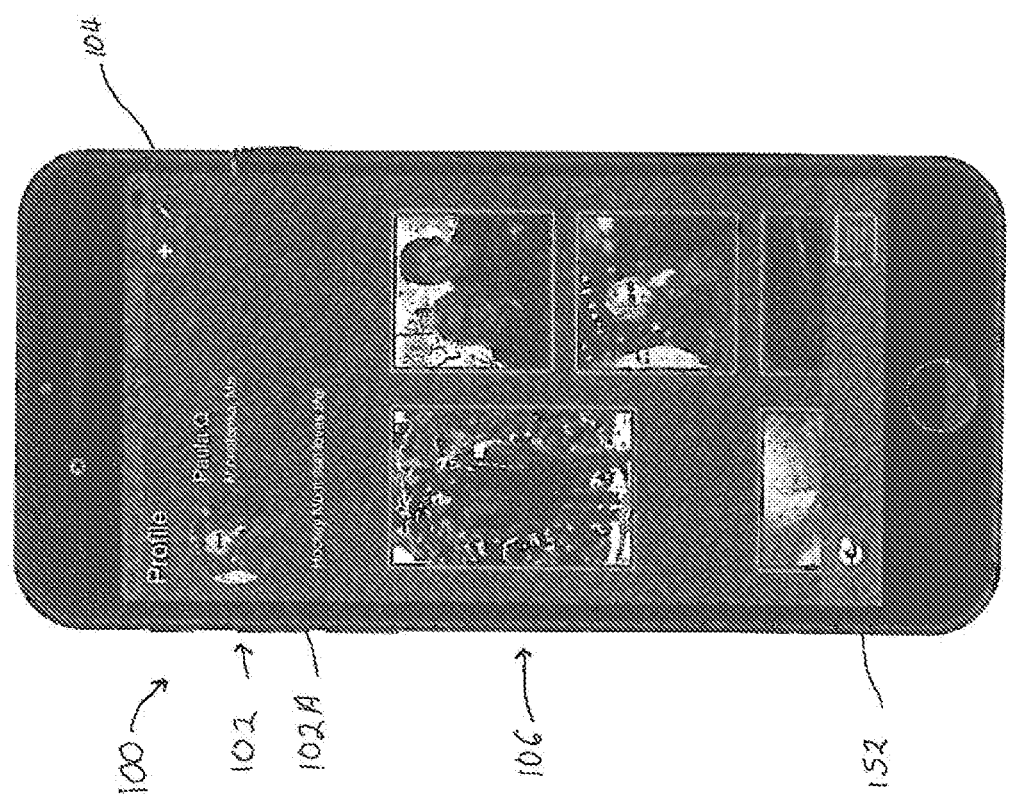
FIG. 6 shows a personalized profile page which may be displayed on the computing device used in FIG. 1 in accordance with one embodiment of the present invention.

In accordance with one embodiment, the login screen 60 may have an area to allow the individual 16 to remain logged in to the personalized profile page 100 of FIG. 6 of the individual 16. By selecting this area using an external device 46 of the computing device 18, the individual 16 may remained logged in to the social network platform 12. Thus, when the individual 16 accesses the webpage 24 or opens the mobile application 26 via the computing device 18 of the individual 16, the individual 16 may be sent directly to the personalized profile page 100 of the individual 16. In this manner, the individual 16 may not have to through the login screen 60.

Figure 3:
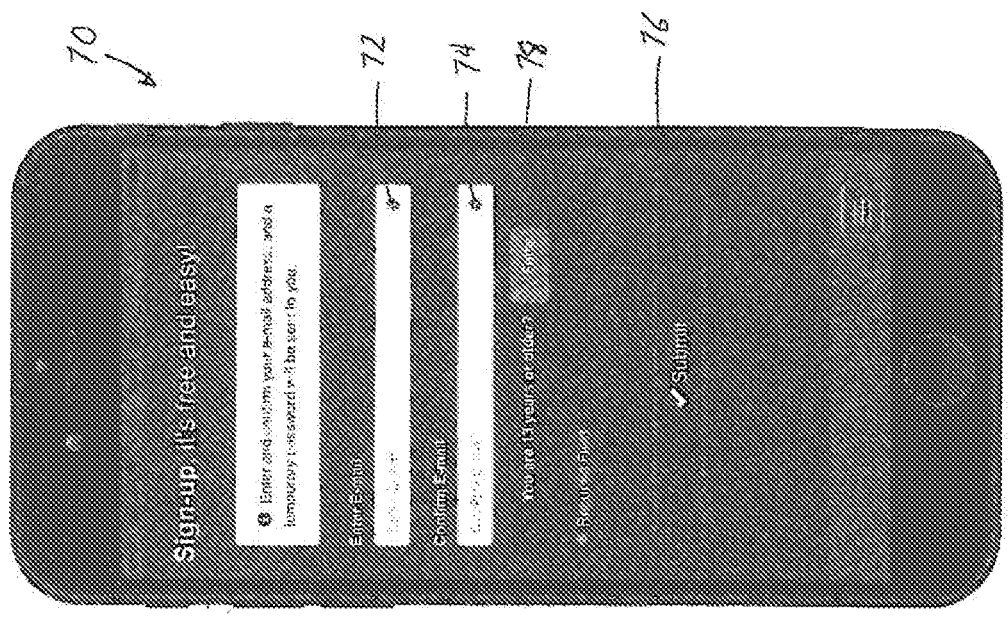
FIG. 3 shows a registration page which may be displayed on the computing device used in FIG. 1 in accordance with one embodiment of the present invention.

If the individual 16 is new to the social network platform 12, the login screen 60 may have a link 67 for the individual 16 to register and become a member of the social network platform 12. By selecting the link 67 using an external device 46 of the computing device 18 of the individual 16, the individual 16 may be sent to a registration page 70 as shown in FIG. 3. The registration page 70 may have a User ID area 72 for entering a User name of the individual 16. In accordance with one embodiment the User ID may be an email address of the individual 16. A confirmation area 74 may be provided on the registration page 70 for the individual to confirm that the User name. In accordance with one embodiment, additional information may need to be submitted on the registration page. For example, an age verification area 78 may be provided to allow one to confirm that the individual 16 is above a certain age. A cellular phone area may be provided to provide an additional level of security. A verification code area may be provided to help prevent disruptive use of automotive programs. Additional user information areas may be provided to allow the individual 16 to provide additional user information such as a user's actual name, date of birth, sex, and similar information.

Figure 3A:
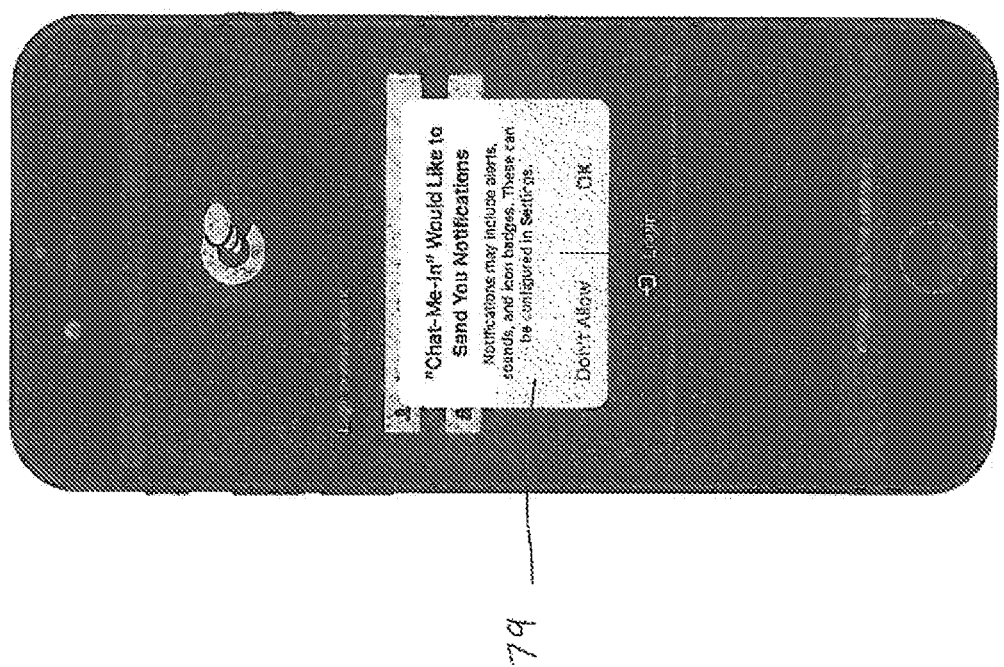
FIG. 3A shows a notification which may be displayed on the computing device used in FIG. 1 in accordance with one embodiment of the present invention.

Once the individual 16 has entered the information in the User ID area 72 and the confirmation area 74, the individual 16 may press a submit button 76 via an external device 46 of the computing device 18 of the individual 16. The User ID information may be sent to the server 14 to verify if the user ID is available. If the User ID is available, the server 14 may send a notification 79 as shown in FIG. 3A. The notification 79 may ask if the individual 16 would like to receive alerts sent by the server 14 regarding the account of the individual 16. The alerts received on the computing device 18 of the individual 16 may be set in the "Settings" page of the computing device 18 of the individual 16.

If the User ID is available, the server 14 may send a temporary password to the individual 16. The temporary password may be sent via email, text, or other suitable communication means.

Figure 5:
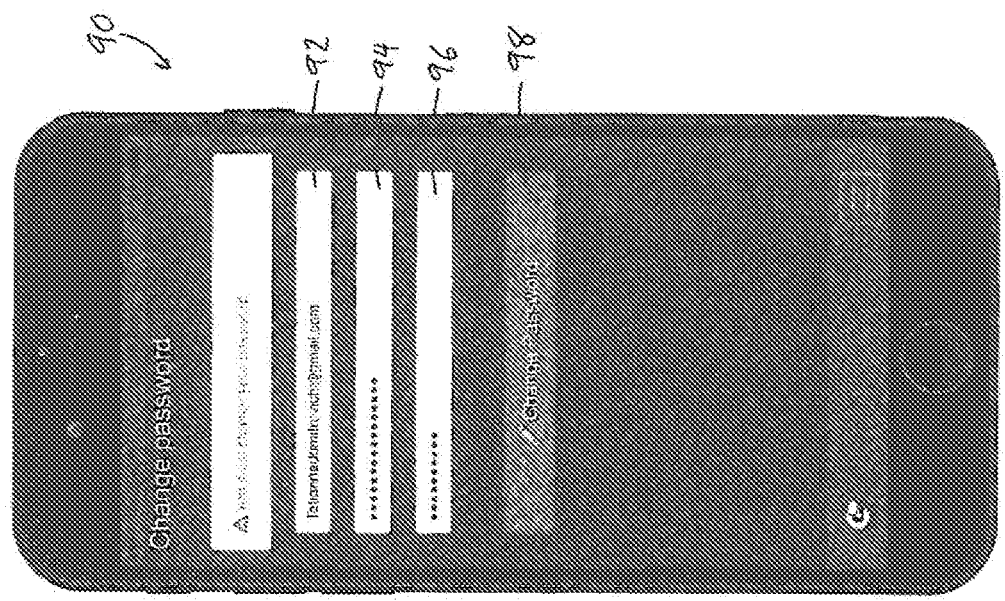
FIG. 5 shows a change password page which may be displayed on the computing device used in FIG. 1 in accordance with one embodiment of the present invention.
Figure 4:
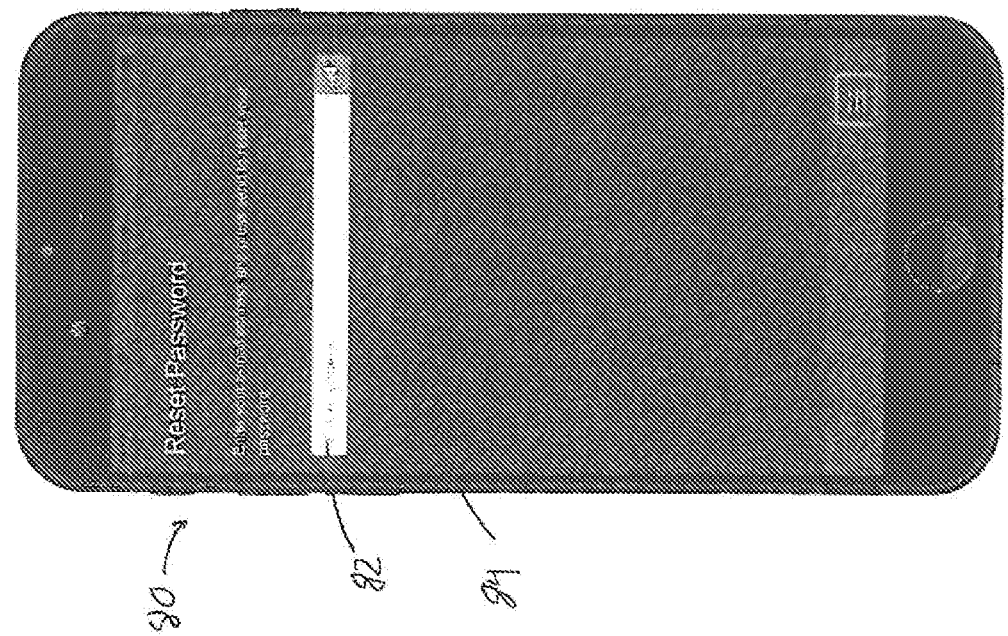
FIG. 4 shows a reset password page which may be displayed on the computing device used in FIG. 1 in accordance with one embodiment of the present invention.
Figure 7:
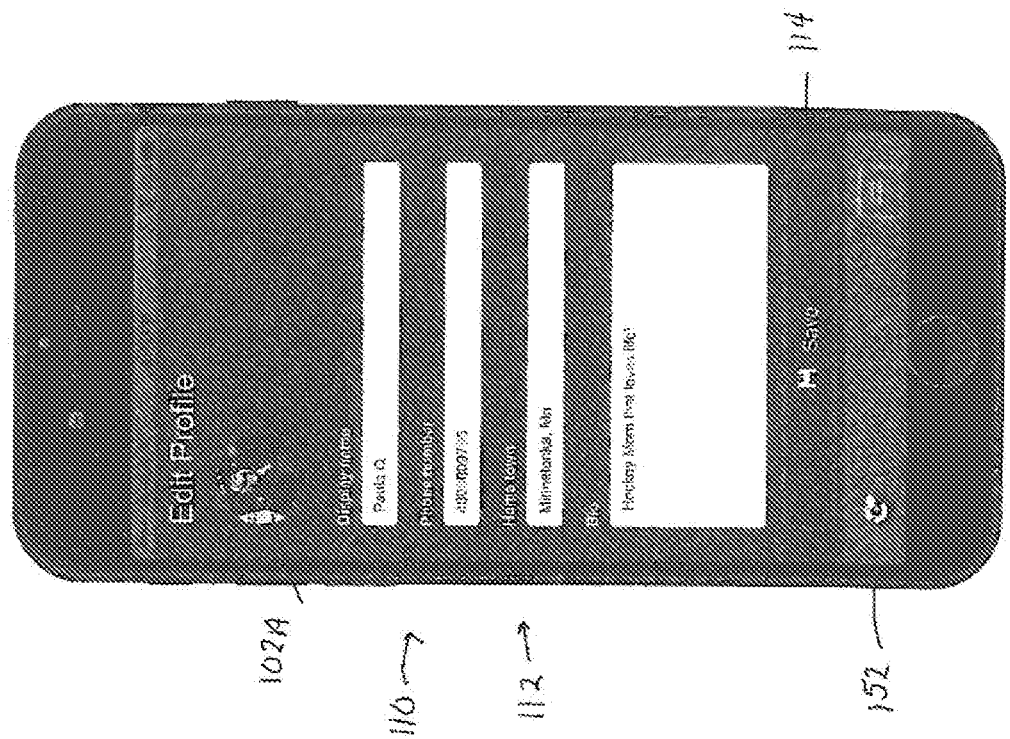
FIG. 7 shows an edit profile page which may be displayed on the computing device used in FIG. 1 in accordance with one embodiment of the present invention.

When the individual 16 presses a submit button 76 via an external device 46 of the computing device 18 of the individual 16, the individual 16 may be sent to a reset password page 80 as may be seen in FIG. 4. The reset password page 80 may have a User ID area 82 for the individual 16 to reenter the User ID. Once the individual 16 enters the User ID information in the User ID area 82, the individual 16 may press a submit button 84 via an external device 46 of the computing device 18 of the individual 16. The individual 16 may then be sent to a change password page 90 as shown in FIG. 5. It should be noted that while the present embodiment describes the reset password page 80 and the change password page 90 as two separate pages, the reset password page 80 and the change password page 90 could be formed as a single page with the information the individual 16 inputs all being entered on one page.

As shown in FIG. 5, the change password page 90 may have a User ID area 92 for the individual 16 to reenter the User ID. An old password area 94 may be provided for the individual 16 to enter the temporary password that the server 14 sent to the individual 16. A new password area 96 may be provided for the individual 16 to enter a new password determined by the individual 16. The individual 16 may press a change password button 98 via an external device 46 of the computing device 18 of the individual 16 to submit the new password to the server 14.

After submitting the new password to the server 14, the individual 16 may be sent to the personalized profile page 100 as shown in FIG. 6. The personalized profile page 100 may have a personal information area 102. The personal information area 102 may allow the individual 16 to display the User ID name, home town, a status update/bio as well as other information about the individual 16. The personal information area 102 may allow the individual to show a profile picture 102A. In the present embodiment, the picture selected may appear in circle to a left side of the User ID name. The profile picture may be taken from camera roll stored on the computing device 18 or taken by a camera of the computing device 18. Located below the personal information area 102, may be an area 106 to post a summary of photos and/or other post by the individual 16. A profile edit button 104 may be provided. By pressing the profile edit button 104 using an external device 46 of the computing device 18 of the individual 16, the individual 16 may be sent to an edit profile page 110 as shown in FIG. 1.

The edit profile page 110 may allow one to make changes to the personalized information shown in the personalized profile page 100. The edit profile page 110 may have a plurality of areas 112 to edit the User ID name, the home town of the individual 16, the status/bio of the individual 16 as well as other information about the individual 16. The edit profile page 110 may allow the individual 16 to change the profile picture and/or add other pictures/videos to the personalized profile page 100. The creator of the photograph may tag friends, comment, and the like. In accordance with one embodiment, only the creator of the photograph may edit the photograph. This feature may prevent other from photo shopping and/or editing a picture that the individual did not take.

By pressing a save button 114 using an external device 46 of the computing device 18 of the individual 16, the edited information may be saves and then displayed on the personalized profile page 100 of the individual 16. All information on the personalized profile page 100 of the individual 16 may be viewed by all contacts listed in a contact section associated with the account of the individual 16. In accordance with one embodiment, any user of the social platform 12 may view photos and/or contact information of individuals 16 having accounts on the social platform 12.

When an individual 16 has registered and logged into the social platform 12, contacts associated with the computing device 18 may be downloaded and stored on a contact search page 120 as shown in FIG. 8. All the contacts 122 downloaded may be shown on the contact search page 120. Contacts 122 may also be loaded from social media sites of the individual 16 such as Facebook®, Instagram®, SnapChat® and similar social networking sites.

Each contact 122 may have an indicator 124. The indicator 124 may show if the contact 122 is a member of the social platform 12 or not. If the indicator 124 shows that the contact 122 is not a member of the social platform 12, the indicator 124 may display "Join". The individual 16 may press the indicator 124 using an external device 46 of the computing device 18 of the individual 16. By pressing the indicator 124, the server 14 may send an invitation 130 to the contact 122 to join the social platform 12 as shown in FIG. 9. The invitation 130 from the server 12 may provide a link to the website 24 so that the contact 122 may join the social platform 12 or the link may be a link to download the mobile application 26 so that the contact 122 may join the social platform 12. The contact 122 may accept or reject the invitation 122. In accordance with one embodiment, the invitation 130 may be a "Join and Connect" invitation. This type of invitation 130 may allow the contact 122 to join the social platform 12 and connect with the individual 16 in one step.

If the contact is a member of the social platform 12, the indicator 124 may display "Connect". By pressing the indicator 124, the server 14 may send the invitation 130 to the contact 122 to connect with the individual 16 on the social platform 12. The contact 122 may accept or reject the invitation 130. Any time the contact 122 accepts an invitation, the contact 122 may be displayed on the "Network or Friends List" page 140 as shown in FIG. 10 of the individual 16 sending the invitation.

In accordance with one embodiment, each contact 122 may display a profile picture 126. If the contact 122 is already a member of the social platform 12, the profile picture 126 on the profile page 110 of the contact 122 may be displayed. If the contact is not a member of the social platform 12 or does not have a profile picture on the on the profile page 110 of the contact 122, a generic picture, or a trademark of the social platform 12 may be displayed as the profile picture 126.

The contact search page 120 may have a search area 128. Using an external device 46 of the computing device 18 of the individual 16, the individual 16 may search the social platform 12 for individuals 16 to connect with. The individual 16 may enter an email address, name, hometown or similar information in the search area 128. The server 14 may send and display different contacts 122 matching the search criteria submitted on the contact page 120. Each of the contacts 122 matching the search criteria submitted may have an indicator 124 allowing the individual 122 to "Connect" with the contact 122.

The "Network or Friends List" page 140 may have a search area 142. Using an external device 46 of the computing device 18 of the individual 16, the individual 16 may search all the contacts 122 on the "Network or Friends List" page 140. The individual 16 may enter an email address, name, hometown and the like in the search area 142. Any of the contacts 122 on the "Network or Friends List" page 140 matching the search criteria may then be displayed on the display 48 of the computing device 18 of the individual 16. As the network of the individual 16 grows, the search feature will be handy to find someone specific in the "Network or Friends List" page 140 by either name or e-mail address.

Figure 11:
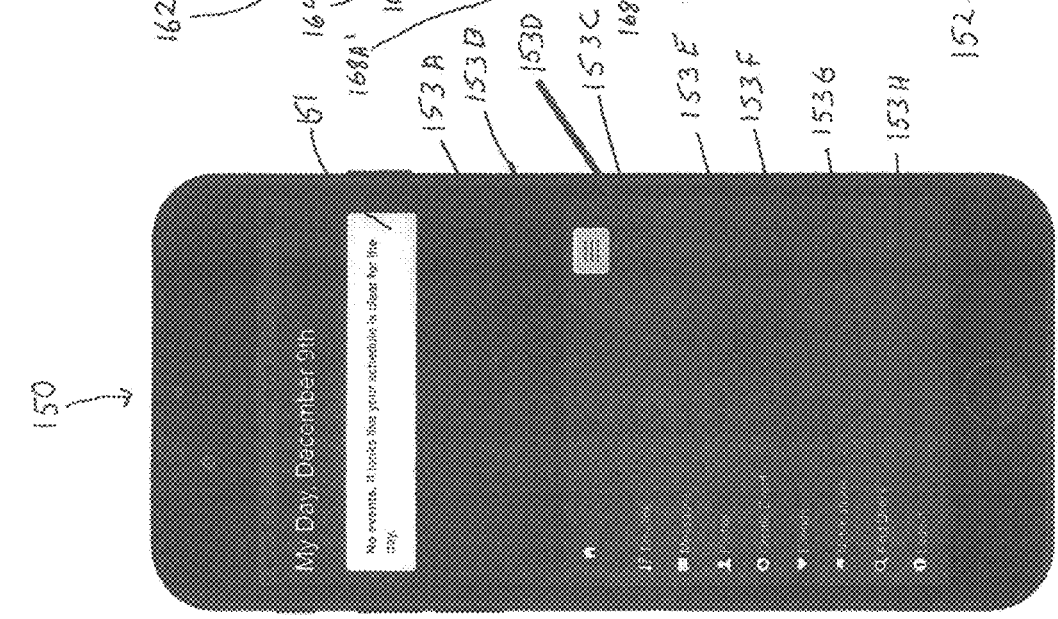
FIG. 11 shows a personalized home page which may be displayed on the computing device used in FIG. 1 in accordance with one embodiment of the present invention.

When the individual 16 logs in to his/her account, the individual 16 may be sent to a personalized home page 150 as shown in FIG. 11. In accordance with one embodiment, one or more of the aforementioned screen pages may have a "Home" button 152. When the individual 16 presses the "Home" button 152 using an external device 46 of the computing device 18 of the individual 16, the individual 16 may be sent to the personalized home page 150 of the individual 16.

The personalized home page 150 may have a plurality of links 153. Each link 153 may provide a mechanism to send the individual to a different personalized page of the individual 16. However, the above is given as an example and should not be seen in a limiting manner. For example, a pull down menu 153' may be provided wherein clicking on the pull down menu 153' may show a plurality of different personalized pages of the individual 16. In accordance with the embodiment shown in FIG. 11, the links 153 may include, but is not limited to a timeline page button 153A, a messaging page button 153B, a personalized home page button 153C, an event creation page button 153D, a "Friends List" page button 153E, a notification page button 153F, a contact search page button 153G, and a logout button 153H.

The event creation page button 153D may send the individual 16 to an event creation page 160 of the individual 16. The event creation page 160 may allow the individual 16 to create and schedule upcoming events. The event creation page 160 may have an invitee area 162. The invitee area 162 may allow the individual 16 to invite one or more participants to the upcoming event being created. It should be noted that if the individual 16 is scheduling a personal event, i.e., dentist appointment, pick-up dry cleaning, etc., the individual 16 may be listed as the participant. In accordance with one embodiment, the individual's contact information may be prelisted in the invitee area 162 since the individual 16 is the one creating the event. The invitee area 162 may be connected to the "Network or Friends List" page 140 of the individual 16. Other participants who are not "connected" with the individual 16 on the social platform 12 may be invited as well. If the invitee is not "connected" to the individual 16, an invite to "connect" and/or "join" the social platform 12 may be included when invite to the upcoming event being created is sent to the invitee.

Figure 12:
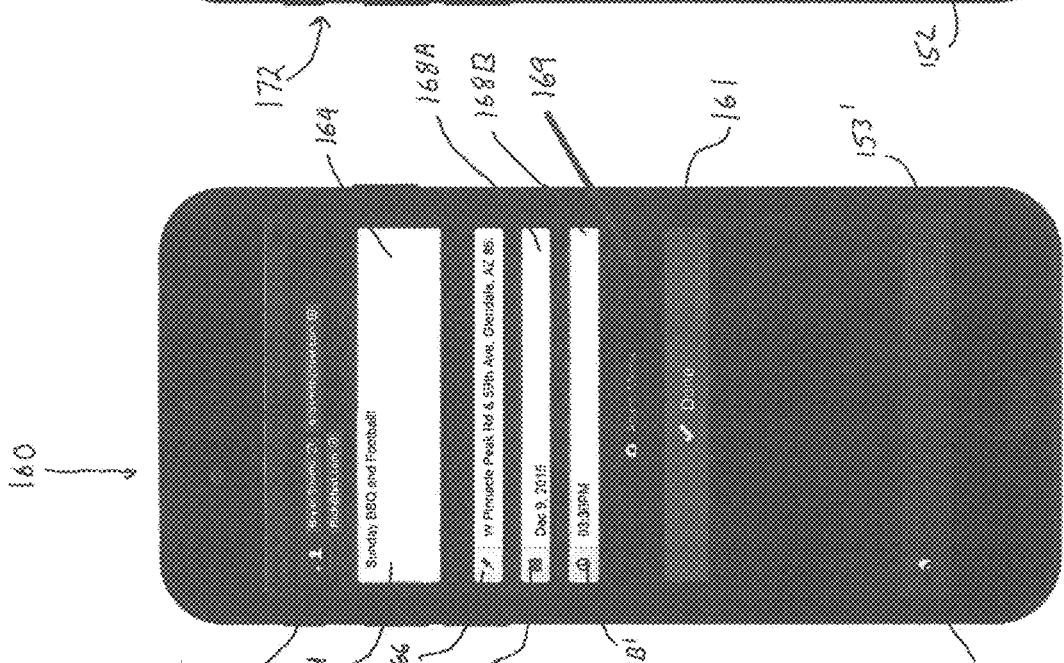
FIG. 12 shows an event creation page which may be displayed on the computing device used in FIG. 1 in accordance with one embodiment of the present invention.

The event creation page 160 may have an event description area 164. The event description area 164 may allow the individual 16 to add textual information related to the event. As show in the embodiment in FIG. 12, the individual added a textual description of the event as being "Sunday BBQ and Football". An address area 166 may be provided on the event creation page 160 to provide a location of the event being created. A date area 168A and time area 168B may be provided to allow the individual 16 to select a date and time for the event.

In accordance with on embodiment, the date area 168A may have a calendar button 168A'. By pressing the calendar button 168A' using an external device 46 of the computing device 18 of the individual 16, a calendar may appear. The individual 16 may then "click" on the desired date for the event. The calendar being displayed may show the current month where the individual 16 may "swipe" the display 48 of the computing device 18 left or right to change the month. Alternatively, a calendar menu may appear wherein scroll wheels allow the individual 16 to select the month, day and year for the event being created. The above are given as examples as other calendars may appear without departing from the spirit and scope of the present invention.

Similarly, in accordance with on embodiment, the time area 168B may have a clock button 168B'. By pressing the clock button 168B' using an external device 46 of the computing device 18 of the individual 16, a clock may appear. The individual 16 may then "adjust" the time on the clock using an external device 46 of the computing device 18 of the individual 16 to the desired time for the event. The clock being displayed may be clock menu wherein scroll wheels allow the individual 16 to select the hour, minute and AM/PM for the event being created. The above are given as examples as other types of clocks may appear without departing from the spirit and scope of the present invention.

Figure 13:
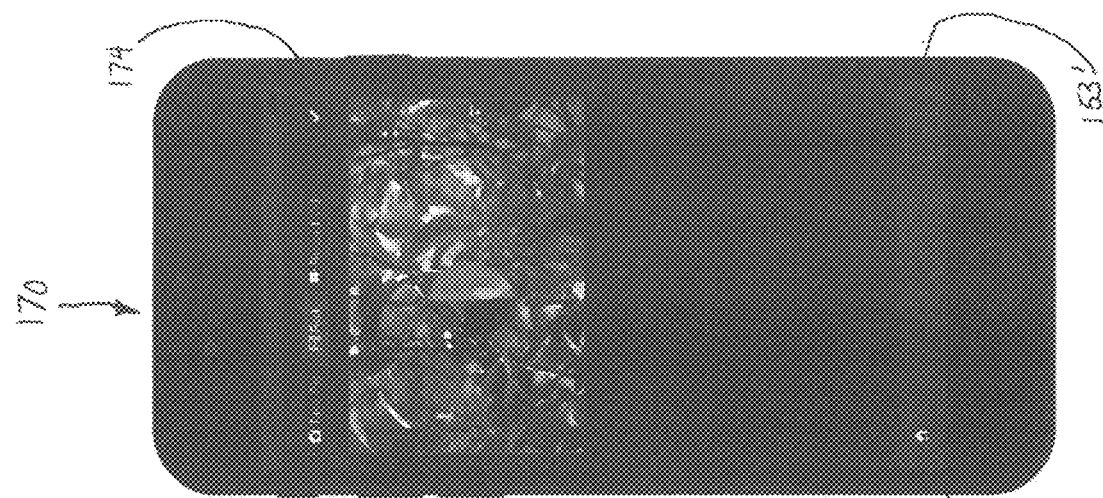
FIG. 13 shows a media attachment page which may be displayed on the computing device used in FIG. 1 in accordance with one embodiment of the present invention.

The event creation page 160 may have a media attachment button 169. By pressing the media attachment button 169 using an external device 46 of the computing device 18 of the individual 16, the individual 16 may be sent to a media attachment page 170 as shown in FIG. 13. The media attachment page 170 may allow the individual 16 to add a picture, a video, an audible message or other media file taken from a recording device of the computing device 18 or stored within the memory 32 of the computing device. A plurality of media selection buttons 172 may be provided to allow the individual to select a desired media file to attach. As show in the embodiment in FIG. 13, the individual added a picture from a camera roll stored in the memory 32 of the computing device as the "camera roll" button is highlighted indicating it has been selected. Once the media file is selected, the individual may load the media file by pressing a loud button 174. The media file selected may be attached and the individual 16 may be sent back to the event creation page 160. The individual 16 may then send out the invitation to the event by pressing the "Done" button 161. The invitation to the upcoming event may then be sent to the individuals listed on the invitee area 162.

Notifications 176 may then be sent to the individuals listed on the invitee area 162 as shown in FIG. 14. The notifications 176 may be text messages, emails, push notifications or other similar notification means. In the embodiment shown in FIG. 14, the mobile application 26 may utilize the native push notification means of the computing device 18. If the user clicks on one of the notifications 176, the individual 16 may be sent to the event page 190 that the individual 16 was notified about. The number of notifications 176 may also be seen on the App screen as may be seen in FIG. 15A.

The individual 16 receiving the notification 176 may then access his/her personal notification page 180 as shown in FIG. 15. The personal notification page 180 may shows event summaries 182 from all the notifications 176 the individual 16 has received over a predetermined timeframe. In accordance with one embodiment, the event summaries 182 may be listed in chronological order with the most recently received notifications on top. Each event summary 182 may have an information area 185. The information area 185 may show a brief summary of the event such as the time, date and type of event that the individual 16 got invited. The event summary 182 may show a profile picture area 183 showing a profile picture of the individual 16 who sent the invitation.

Each event summary 182 may have an "Accept" button 184A and a "Reject" button 184B. The individual 16 may accept or reject any of the event summaries 182 that he/she receives. Once the event summary 182 has been accepted or rejected, the event summary 182 may still remain on the personal notification page 180. This may allow the individual 16 to change the response at a later time if necessary. Each event summary 182 may have a status area 187. The status area 187 may show whether the individual 16 receiving the invitation has accepted, rejected or has not responded to the invitation. The event summary 182 may have a trash button. The trash button may allow one to discard the event summary 182 if so desired.

Figure 16:
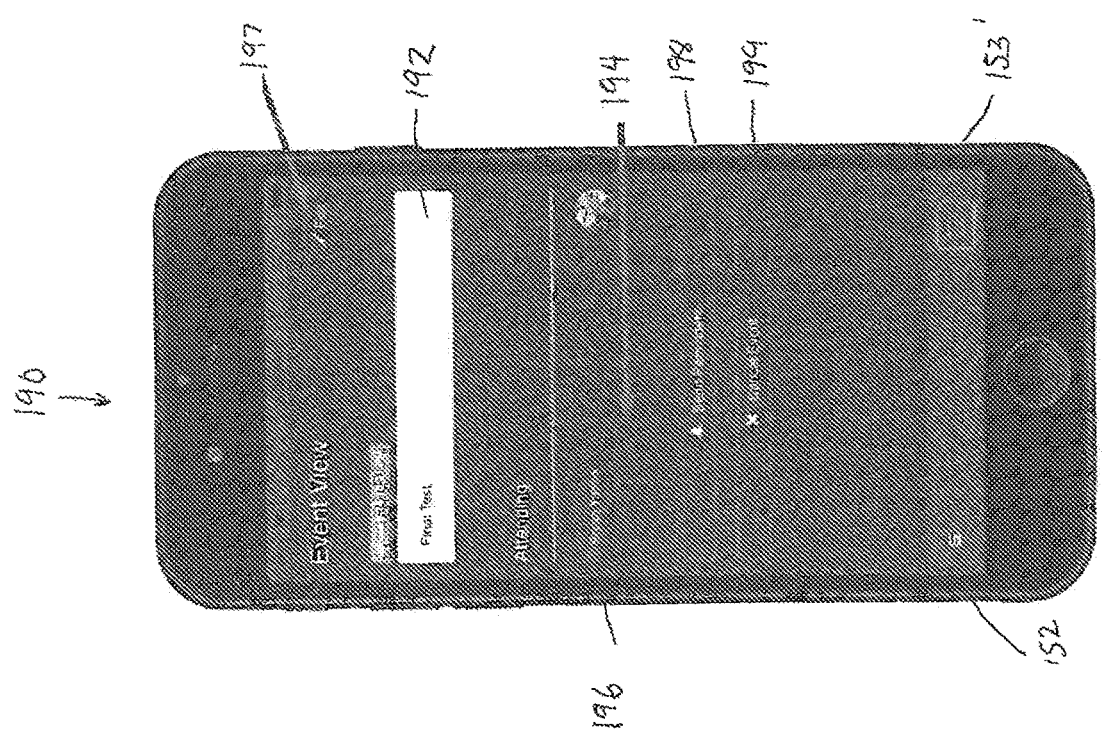
FIG. 16 shows a detail event page which may be displayed on the computing device used in FIG. 1 in accordance with one embodiment of the present invention.

If the individual 16 receiving the event summary 182 or the individual sending the invite would like to see details of the upcoming event the individual 16 may tap on the event summary 182. By tapping on the event summary 182, the individual 16 may be sent to a detail event page 190 as may be seen in FIG. 16. The detail event page 190 may have a description area 192. The description area 192 may show detailed information of the upcoming event. The description area 192 may show the location, time, date as well as other detailed information of the upcoming event. In accordance with one embodiment, if the individual 16 presses on the location information, the individual 16 may be sent to a mapping application to show the location on a map of the upcoming event. The individual 16 may then use the mapping application to receive directions to the upcoming event.

If an attachment has been included with the invitation, the individual 16 may view the attachment (i.e., picture, video, etc.). The detail event page 190 may have a response area 194. The response area 194 may show the individuals 16 who are attending, the individuals 16 who are not attending, and individuals 16 who have not responded. The response area 194 may have a status indicator 196 next to the User name of each individual 16 invited. The status indicator 196 may be color coded to show the status of each individual 16 invited. In accordance with one embodiment, the status indicator 196 may be color coded green for attending, red for not attending and clear for no response. In accordance with one embodiment, once the event has started, the status indicator 196 may be color coded blue if the individual 16 has checked in at the event and black if the individual 16 has not check in. In accordance with one embodiment, a "check-in" button may be provided to allow the individual 16 to press once the individual 16 has arrived at the event in order to "check-in". The button may use a location service associated with the computing device 18 to verify that the individual 16 is currently at the event.

The detail event page 190 may have a transportation button. By pressing the transportation button, the individual 16 may be directed to a transportation application such as Uber®, Lyft®, cab company apps, or other transportation type service provider apps. This may allow the individual 16 to schedule a ride to the event as well as transportation home once the event is over.

The detail event page 190 may have an edit button 197. The edit button 197 may allow one to edit details of the event. In accordance with one embodiment, only the individual 16 who created the event may edit details of the event. If the individual 16 who created the event does press the edit button 197, the individual 16 may be sent to an edit event page 200 as shown in FIG. 17.

The detail event page 190 may have a send reminder button 198. By pressing the send reminder button 198, a reminder of the event may be sent to those invited. The reminder sent may be a text message, an email, a push notification or similar communication mechanisms. In accordance with one embodiment, event reminders may be sent to those individual 16 who have accepted the invite.

The detail event page 190 may have a cancel event button 199. The cancel event button may 199 allow one to cancel the event created. In accordance with one embodiment, the individual 16 who created the event may be the only person to cancel the event. If the event is cancelled, cancelled notifications may be sent to the invitees. The cancelled notifications may be a text message, an email, a push notification or similar communication mechanisms.

Figure 17:
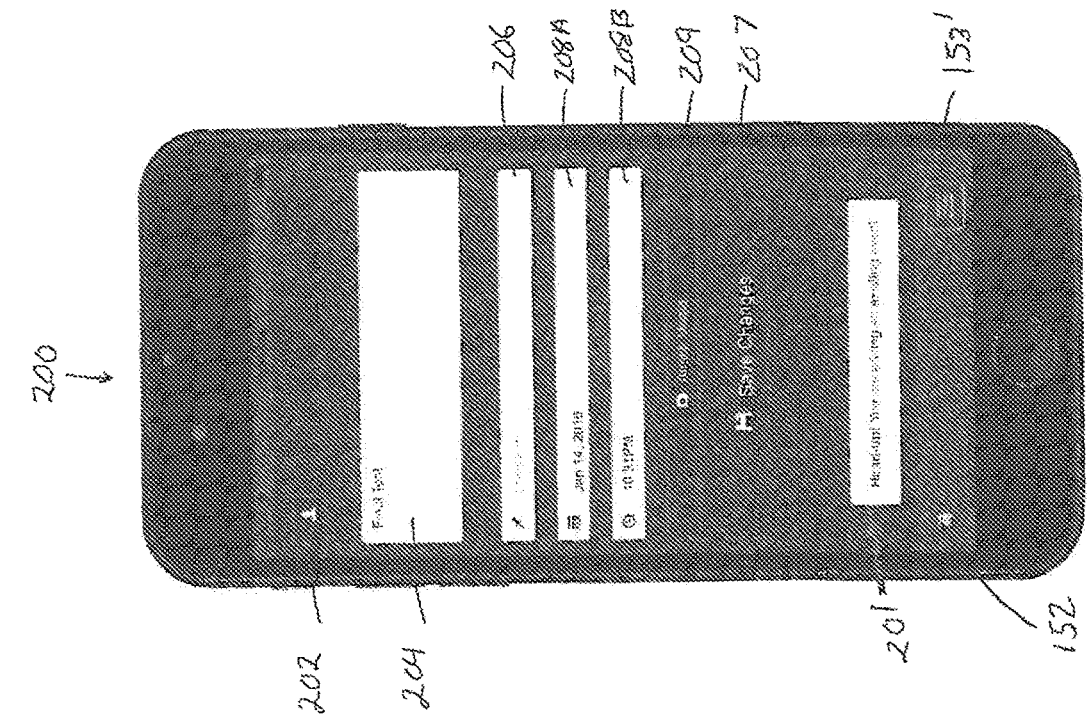
FIG. 17 shows an edit event page which may be displayed on the computing device used in FIG. 1 in accordance with one embodiment of the present invention.

The edit event page 200 shown in FIG. 17 may be similar to the event creation page 160. The edit event page 200 may have an invitee area 202. The invitee area 202 may allow the individual 16 to add and/or remove one or more participants to the upcoming event that was created. The invitee area 202 may be connected to the "Network or Friends List" page 140 of the individual 16. Other participants who are not "connected" with the individual 16 on the social platform 12 may be invited as well. If the invitee is not "connected" to the individual 16, an invite to "connect" and/or "join" the social platform 12 may be included when invite to the upcoming event being created is sent to the invitee.

The edit event page 200 may have an event description area 204. The event description area 204 may allow the individual 16 to modify the textual information related to the event. An address area 206 may be provided on the edit event page 200 to modify the location of the event created. A date area 208A and time area 208B may be provided to allow the individual 16 to edit the date and time for the event created.

The edit event page 200 may have a media attachment button 209. The media attachment button 209 may allow the individual 16 to add and/or change a picture, a video, an audible message or other media file taken from a recording device of the computing device 18 or stored within the memory 32 of the computing device. The individual 16 may then save the changed by pressing a "Save" button 207. The revised invitation to the upcoming event may then be sent to the individuals listed on the invitee urea 162 after the "Save" button 207 has been selected. In accordance with one embodiment, the edit event page 200 may have an editing alert area 201. The editing alert area 201 may display a warning that the individual 16 may be making changes to the event.

Figure 18:
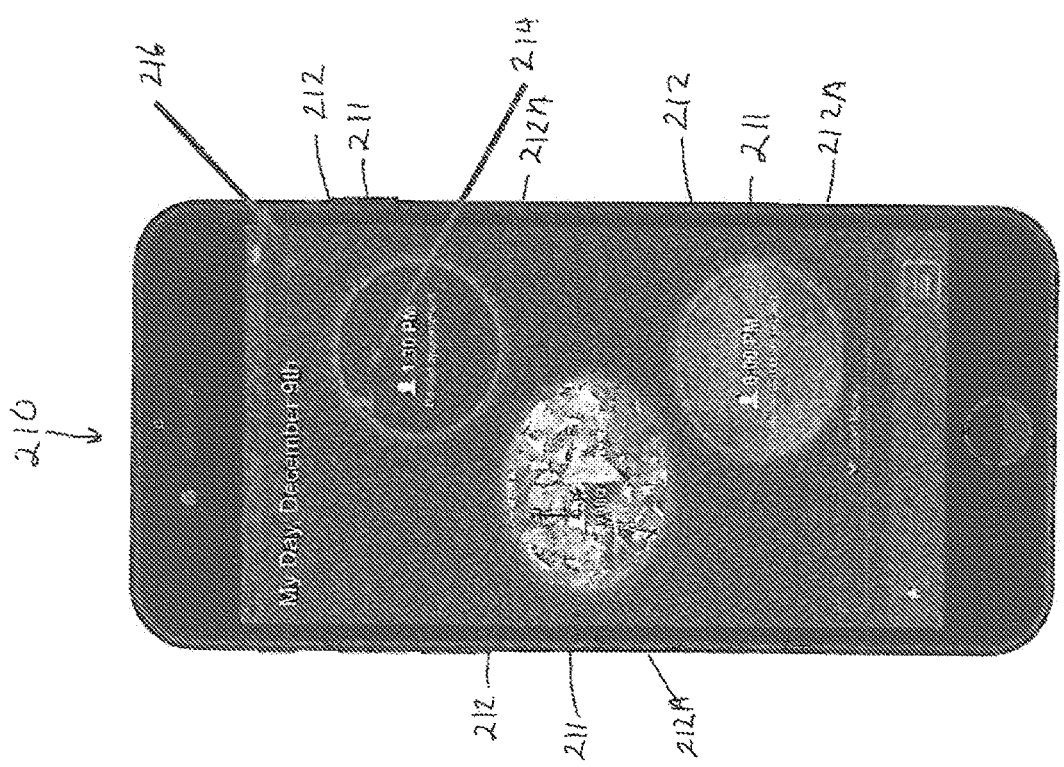
FIG. 18 shows a current day schedule page which may be displayed on the computing device used in FIG. 1 in accordance with one embodiment of the present invention.

The personalized home page 150 shown in FIG. 11 may have a "My Day" section 151. The current date at a top area of the "My Day" section 151. Selecting the "My Day" section 151 may display a full schedule page 210 of all the events 211 the individual 16 has created or accepted for the current day as shown in FIG. 18. However, if no events have been scheduled, a message may appear saying that the schedule of the individual 16 is free as shown in FIG. 11. The events 211 for the current day may be displayed in chronological order. Each event 211 may be shown as a bubble 212. A description of the event 211 may be shown inside of each bubble 212. If a picture has been attached to the invitation, the picture may be shown within the bubble 212. Each bubble 212 may be adjustable based on a size of the description of the event. Thus, some bubbles 212 may appear larger than others based on description size of the event.

Figure 19:
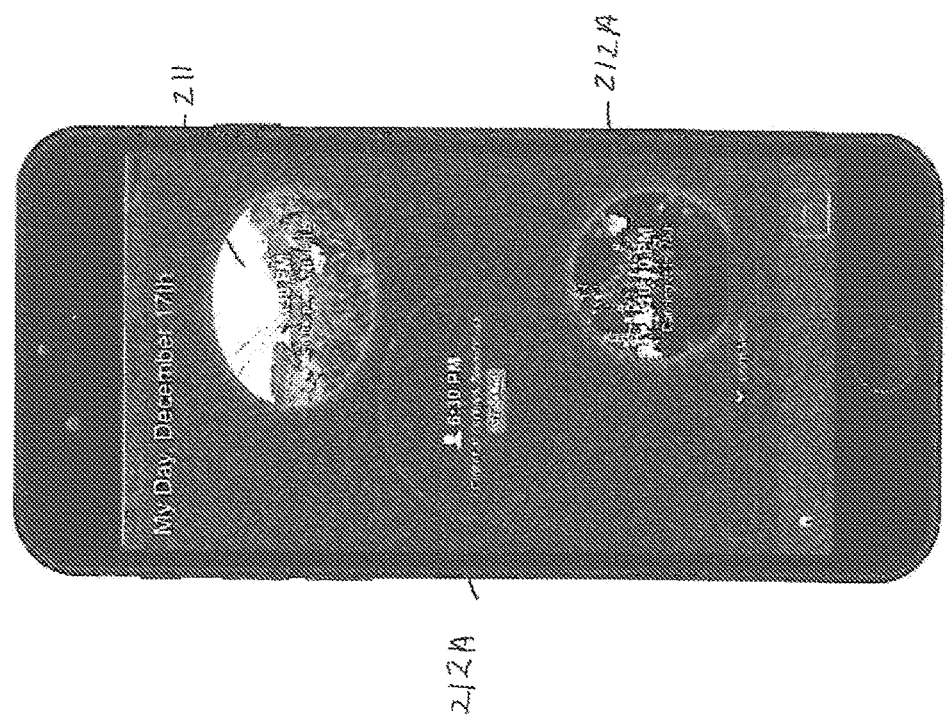
FIG. 19 shows an event signaling means which may be displayed on the computing device used in FIG. 1 in accordance with one embodiment of the present invention.

The bubble 212 may signal to the individual 16 that the event may be occurring soon. In accordance with one embodiment, the perimeter 212A of the bubble 212 may pulsate and/or glow prior to the start of the event. The individual 16 who created the event may determine when the bubble 212 may signal to the individual 16 of the upcoming event. For example, the individual 16 who created the event may set-up the perimeter 212A of the bubble 212 to pulsate and/or glow prior 1 hour prior to event as shown in FIG. 19. In accordance with one embodiment, the bubble 212 may pulsate and glow a green color prior to event as shown in FIG. 19. If the event has been cancelled, the bubble may signal of the cancellation. For example, the perimeter 212A of the bubble 212 may pulsate and glow red to indicate the cancellation as shown in FIG. 19. The cancelled events may remain on the full schedule page 210 until end of day and then may disappear. The cancelled event may have the ability to be edited and become current again. Thus, the reason for keeping the cancelled event on the full schedule page 210 until end of day.

If a plurality of events is shown on the full schedule page 210, the individual 16 may scroll to view the different events. In accordance with one embodiment, the individual 16 may "swipe" a finger upwards and/or downwards on a display 48 of the computing device 18 to view the different events if the individual 16 is using the mobile application 26.

Invitees to the event may send reminders of the event to the creator of the event and/or other invitees. The creator of reminder may put together a picture or short video reminder. In accordance with one embodiment, the length of the video may be limited to a predetermined length, for example, 10 seconds. The creator of the reminder may add a picture or video from a camera roll stored in the memory 32 of the computing device 18 or may take a picture or video via a camera of the computing device. Once the reminder is sent, the reminder may appear as a reminder bubble 214 and may be attached to the perimeter of the bubble 212 of the "Event". By pressing on the reminder bubble 214, the individual 16 receiving the reminder may view the picture or video sent. Once the reminder has been viewed, the picture or video may be erased after a predetermined time period, i.e., 7 seconds, unless the creator selects the reminder to be seen all day. If the creator selects the reminder to be seen all day, the picture or video reminder may be erased 24 hours after being viewed.

The reminder bubble 214 may appear at a predetermined time prior to event. In accordance with one embodiment, the creator may determine when the reminder bubble 214 may appear. For example, the creator of the reminder may wish for the reminder to be sent 30 minutes prior to the start of the event. Individuals 16 may be limited to the number of reminders sent. In accordance with one embodiment, the number of reminders can be limited to 10 per event bubble 212. The reminders may be used for numerous reasons. One is to send reminders of the event to different invitees. Another use is to send notes to certain invitees. For example, one spouse may send a reminder to the other spouse to remember to bring a bottle of wine to an upcoming dinner party event. The spouse sending the reminder may include a picture of the wine to drink. A boyfriend/girlfriend may send a love note reminder saying they are looking forward to their dinner date and may include a photo or emoji. The above is given as examples and should not be seen in a limiting manner.

The full schedule page 210 shown in FIG. 18 may have a secret message notification 216. This feature may allow an individual 16 to create and send a "Secret Message" to anyone in the "Network or Friends List" page 140 of the individual 16. The "Secret Message" is anonymous so the receiving party does not know who sent the "Secret Message". The receiving party does know that the "Secret Message" to from someone on their "Network or Friends List" page 140. When the receiving party clicks on the secret message notification 216, the receiving party may read the "secret message". The receiver of the "Secret Message" may have the ability to block the secret message sender at any time without knowing who the sender is.

Figure 20:
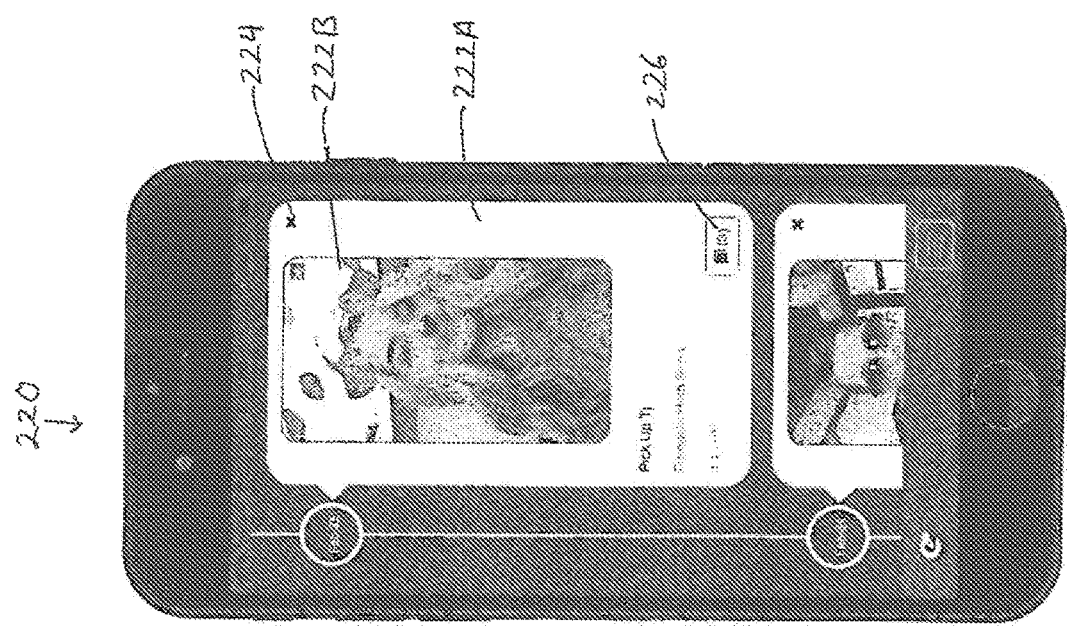
FIG. 20 shows a timeline page which may be displayed on the computing device used in FIG. 1 in accordance with one embodiment of the present invention.

Pressing the timeline page button 152A on the personalized home page 150 may send the individual 16 to a timeline page 220 as shown in FIG. 20. Passed events may appear on the timeline page 220. Once an event has occurred, the event may appear on the timeline page on the next day. Each event on the timeline page 220 may have an event summary 222. The event summary 222 may have a summary area 222A showing a brief description of the event. The summary area 222A may have a picture area 222B for displaying a picture associated with the event. The event summary 222 may stay on the timeline page 220 unless the individual 16 removes it. A removal button 224 may be located within the event summary 222. Pressing the removal button 224 deletes the event summary 222 from the timeline page 220.

Figure 21:
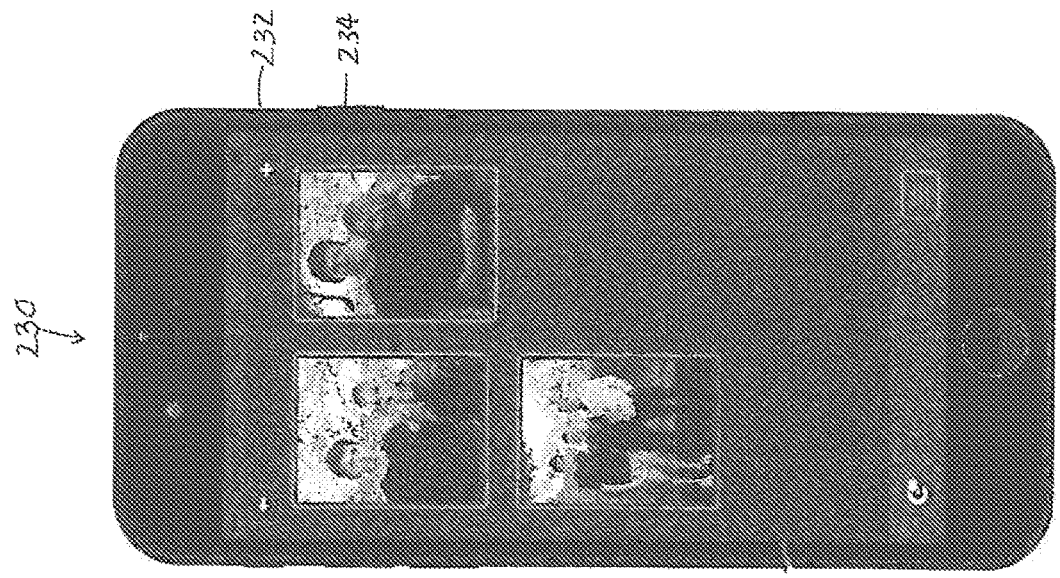
FIG. 21 shows a photo album of an event which may be displayed on the computing device used in FIG. 1 in accordance with one embodiment of the present invention.

The event summary 222 may have a photo album button 226. Pressing the photo album button 226 takes the individual 16 to a photo album 230 of the event as shown in FIG. 21. The photo album button 226 may have an indicator displaying the number of photos in the photo album 230. Any individual 16 invited to the event may upload photos and/or videos of the event by pressing an upload button 232 and uploading the photo or video to the album. In accordance with one embodiment, only the individual 16 who uploaded the picture or video may delete the photo or video. Any individual 16 may have ability to lag people in the photos and write on uploaded photos. The photos 234 in the photo album 230 may appear in a grid format. The photos 234 may be tapped to view the photo 234 in full resolution and size.

Figure 23:
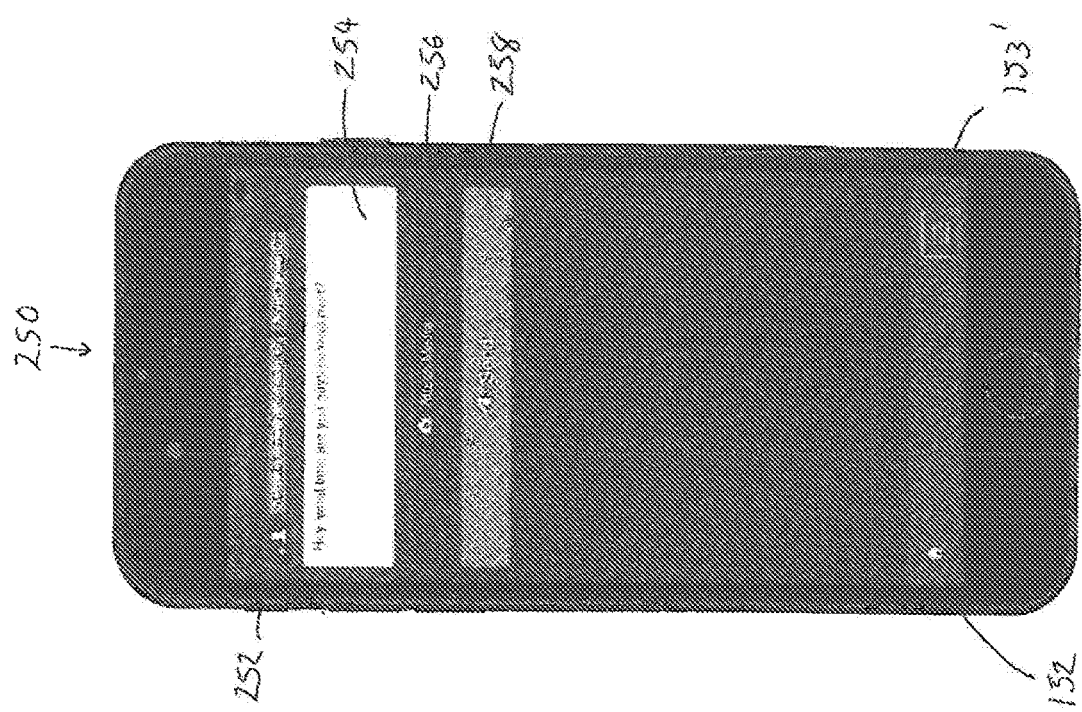
FIG. 23 shows a messaging page which may be displayed on the computing device used in FIG. 1 in accordance with one embodiment of the present invention.
Figure 22:
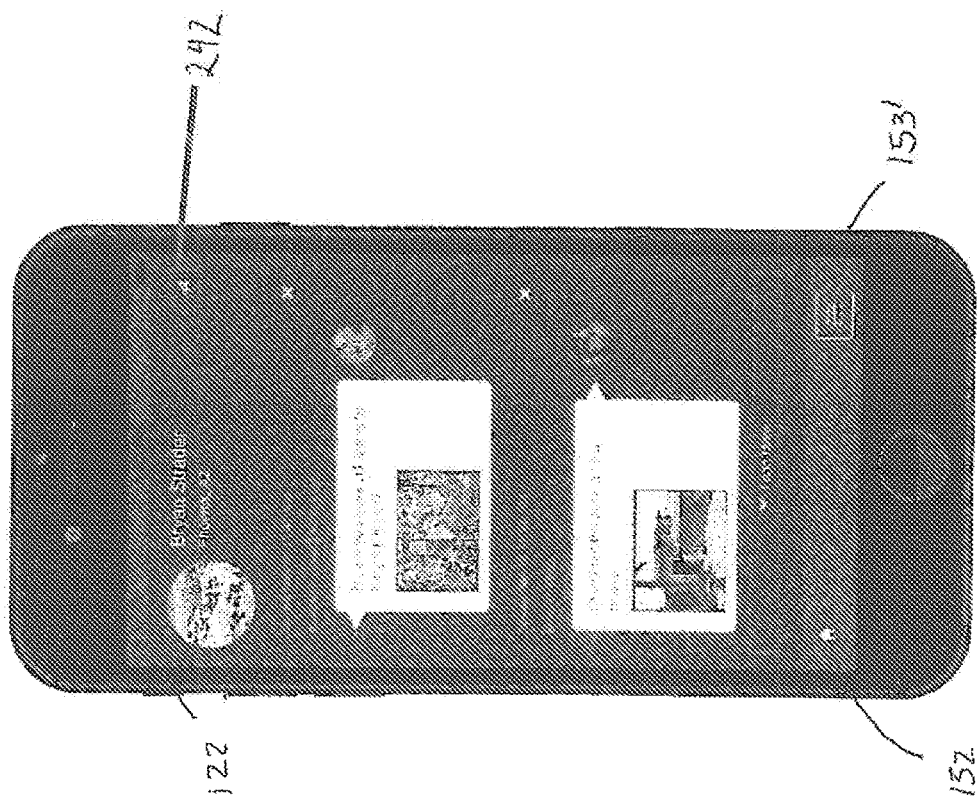
FIG. 22 shows a direct message page which may be displayed on the computing device used in FIG. 1 in accordance with one embodiment of the present invention.

The social platform 12 may allow individuals 12 to directly message anyone listed in their "Network or Friends List" page 140. Referring to FIG. 22, a direct messaging button 242 may be located next to a contact 122 listed in the "Network or Friends List" page 140 of the individual 16. Pressing the direct messaging button 242 allows the individual 16 to directly message the selected contact 122. A messaging page 250 as shown in FIG. 23 may be displayed when the messaging button 242 is pressed. The messaging page 250 may have an address area 252. The address area 252 may display the contact name to whom the direct message is being sent. The address area 252 may allow the individual 16 to add additional contacts to the direct message being sent. The messaging page 250 may have a message area 254. The message area 254 is where the textual message may be entered by the individual 16. An attachment button 256 may be provided. The attachment button 256 may allow the individual 16 to add a textual attachment, picture, video or other type of attachment to the message being sent. A send button 258 may be used to send the direct message to the designated contacts. As may be seen in FIG. 22, once a message has been sent, all outgoing and incoming messages may be displayed to the contact 122. All direct messaging and sending of pictures/videos may be done within the social platform 12 so texting charges may not apply no matter where the participants may be located.

Figure 24:
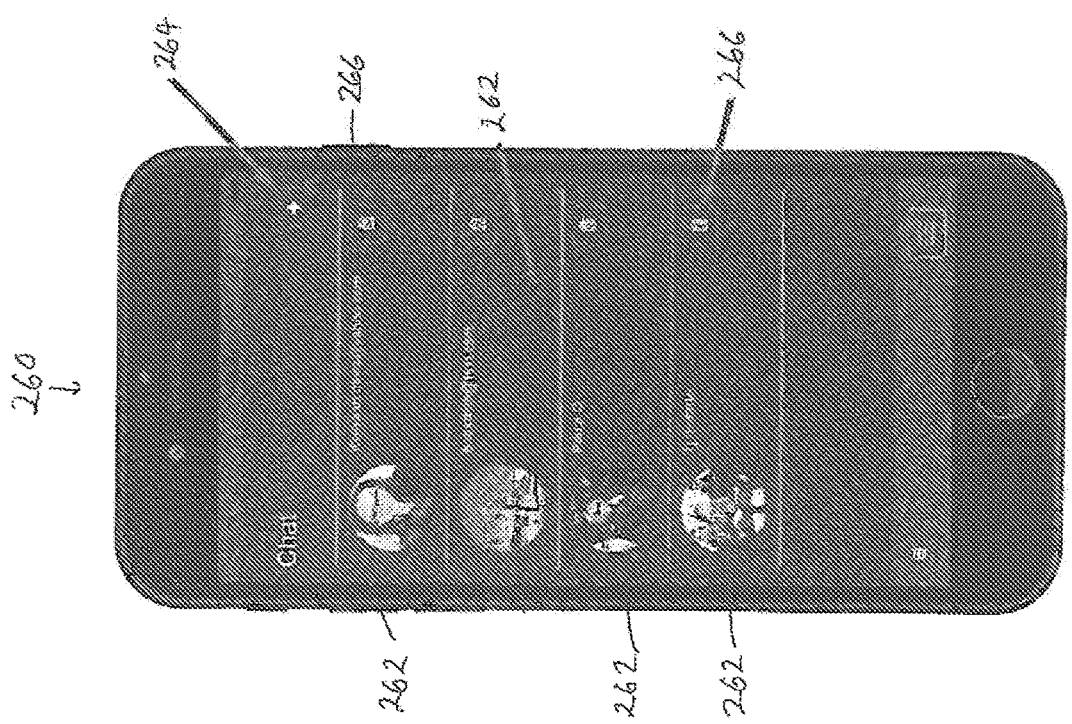
FIG. 24 shows a chat page which may be displayed on the computing device used in FIG. 1 in accordance with one embodiment of the present invention.

The social platform 12 may allow chatting with one or more contacts 122. In accordance with one embodiment, the chatting feature may be launched by pressing the messaging page button 152B. Pressing the messaging page button 152B may bring up a chat page 260 as shown in FIG. 24. The chat page 260 may show all existing conversations 262 the individual 16 has had during a predefined time period.

To start a new conversation, an individual 16 may push a start new chat button 264. A chat page similar to the messaging page 250 may then be displayed. The individual 16 may then enter the addresses of all the contacts 122 the individual 16 may want to include in the chat session. A message area may be provided and is where the chat message may be entered by the individual 16. An attachment button may be provided. The attachment button may allow the individual 16 to add a textual attachment, picture, video or other type of attachment to the chat session. A send button may be used to submit the chat message to the designated contacts.

Each of the existing conversations 262 may have a trash button 266. The trash button 266 may be used to delete the selected existing conversations 262 from the computing device 18 of the individual 16. In accordance with one embodiment, while one participant in the chat session may delete the existing conversations 262 from the chat page 260, the existing conversation 262 may remain on the other participant's chat page 260.

Figure 25:
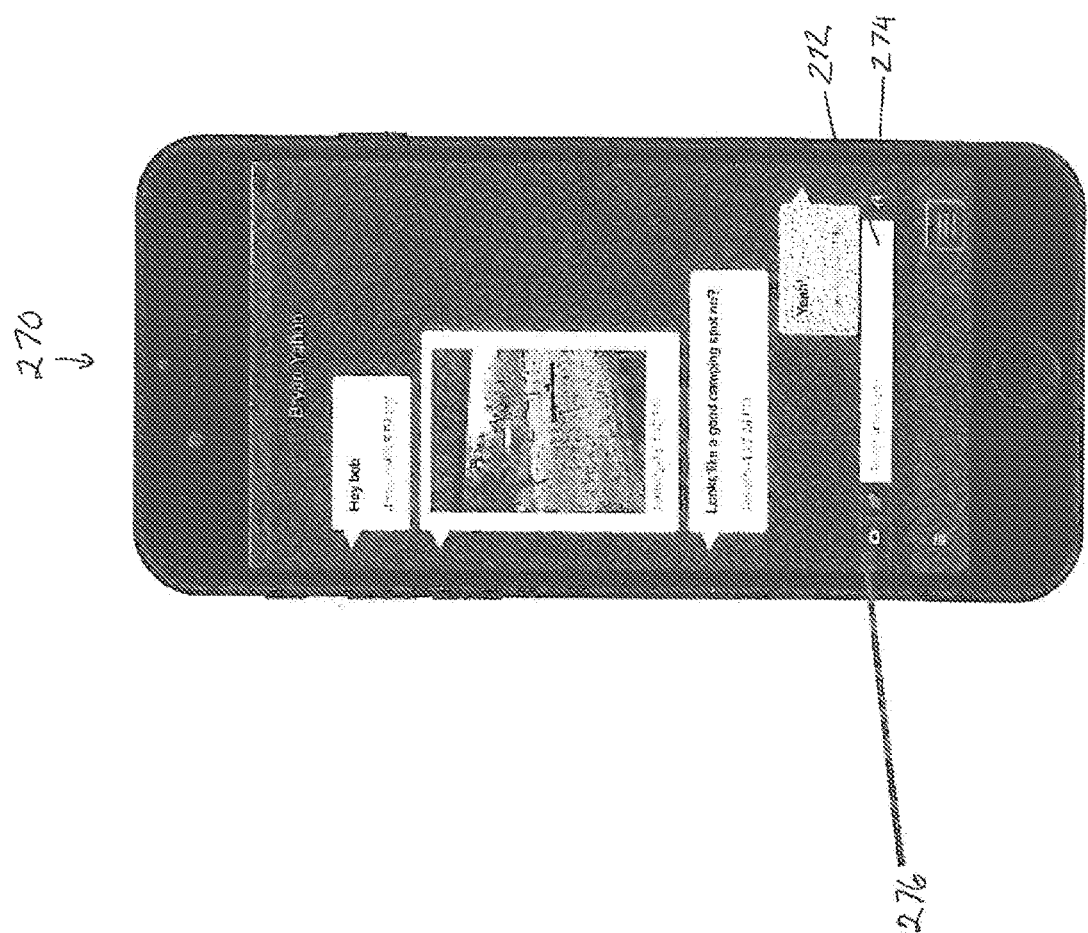
FIG. 25 shows a detailed conversation page which may be displayed on the computing device used in FIG. 1 in accordance with one embodiment of the present invention.

To continue with an existing conversation 262, the individual may tap on the desired existing conversation 262. The individual 16 may then be sent to a detailed conversation page 270 as shown in FIG. 25. The detailed conversation page 270 may show all correspondence between the participants. The individual 16 may enter text in a text area 272 that the individual wishes to send to the other participants in the chat session. Once the text has been entered, the individual 16 may press a submit button 274 to send the text. The individual 16 may send an attachment in the chat session. An attachment button 276 may be provided and may allow the individual 16 to add a textual attachment, picture, video or other type of attachment to the chat session. When attaching a photo, the individual 16 may have the ability to add comments, emojis, funny face themes, holiday decals, and the like. The text and images sent to another user inside a chat bubble that depicts whether or not it is incoming or outgoing chat message Text and images may be sent to another user inside a chat bubble that depicts whether or not it is incoming or outgoing chat messages.

The foregoing description is illustrative of particular embodiments of the invention, but is not meant to be a limitation upon the practice thereof. The following claims, including all equivalents thereof, are intended to define the scope of the invention.

What is claimed is:

1. A method of event creation and communication comprising:
    sending an invitation to an event by an individual;
    displaying the invitation on an event page of the individual, wherein the invitation appears as a geometric shape on the event page of the individual, information on the event displayed within the geometric shape;
    displaying a timeline of events of the individual, the timeline of events showing all events the individual has attended over a predetermined timeframe, wherein the events are displayed in chronological order, each event showing an event summary having a brief description of the event and a picture associated with the event; and
    displaying an album button for each of the events displayed on the timeline of events, the album button for each of the events showing a photo album displaying image files from that specific event loaded by the individual and invitees to that specific event, wherein an upload button in the photo album allowing the individual and invitees to upload the image files to the photo album.

2. The method of claim 1, comprising attaching one of a photo, video or text file to the invitation, wherein the photo, video or text file appears in the geometric shape on the event page of the individual.

3. The method of claim 1, comprising:
    sending a reminder of the event by one of the individual or an invitee, the reminder appearing as a reminder bubble attached to the geometric shape, the reminder bubble displayed at a predetermined timeframe prior to the event and will be displayed for a desired time determined by a sender of the reminder, wherein the sender of the reminder attaching one of a reminder photo or a reminder video to the reminder;
    displaying the reminder photo or the reminder video when the reminder bubble is selected, wherein the reminder photo or the reminder video is deleted after the desired time determined by the sender expires after the reminder photo or the reminder video is viewed.

4. The method of claim 1, comprising sending a reminder at a predetermined timeframe prior to the event.

5. The method of claim 1, wherein all events for a current day are displayed in chronological order on the event page of the individual, the individual and at least one invitee who has accepted the invitation able to scroll through all the events when a plurality of events are displayed.

6. The method of claim 1, comprising pushing a notification to the event.

7. The method of claim 1, comprising displaying a notification page of at least one invitee, the notification page displaying all invitations received and sent by the at least one invitee, wherein each invitation displayed on the notification page has a status indicator showing a current status of the at least one invitee as accepted, rejected or has not responded.

8. The method of claim 1, comprising displaying a notification page of the individual sending the invitation, the notification page displaying all invitations received and sent by the individual, wherein each invitation displayed on the notification page has a status indicator showing a current status of each invitee as accepted, rejected or has not responded.

9. The method of claim 1, comprising displaying a detail event page, wherein the detail event page shows each invitee and a status indicator of each invitee, the status indicator showing a current status of each invitee has accepted, rejected or check-in to the event.

10. The method of claim 1, comprising displaying a secret message notification on the event page, the secret message notification indicating that a person in a contact list of a receiving party of the secret message notification has sent an anonymous message, wherein pressing the secret message notification displays the anonymous message.

11. The method of claim 1, comprising illuminating a perimeter of the geometric shape at a predetermined timeframe prior to the event.

12. The method of claim 11, wherein each event displayed has a trash button removing the event from the timeline.

13. The method of claim 1, comprising displaying a direct message button approximate each person in a contact list of the individual, the direct message button approximate each person in a contact list of the individual allowing the individual to directly text the selected person.

14. The method of claim 1, comprising displaying a chat page allowing the individual to chat with one or more people in a contact list of the individual.

15. A computing device comprising:
    a processor;
    a display coupled to the processor;
    a user interface coupled to the processor for entering data into the computing device; and
    a memory coupled to the processor, the memory storing program instructions that when executed by the processor, causes the processor to:
    connect with a server hosting a social platform for event creation and communication;

create an invitation by an Individual of the computing device to an event through the social platform;
attach one of a photo, video or text file to the invitation;
send the invitation to at least one invitee;
display the invitation on an event page of the individual and the at least one invitee, wherein the invitation appears as a geometric shape on the event page of the individual and the at least one Invitee, information on the event displayed within the bubble;
display a notification page of the at least one invitee, the notification page displaying all invitations received and sent by the at least one invitee, wherein each invitation displayed on the notification page has a status indicator showing a current status of the at least one invitee has accepted, rejected or has not responded to the invitation;
send a reminder of the event, the reminder appearing as a reminder bubble attached to the geometric shape on the event page of the individual and the at least one invitee, the reminder bubble displayed at a predetermined timeframe prior to the event and will be displayed for a desired time determined by a sender of the reminder;
illuminate a perimeter of the geometric shape at a predetermined timeframe prior to the event;
display all events for a current day in chronological order on an event page of the individual and an event page of the at least one invitee, wherein the individual and the at least one invitee are able to scroll through all the events when a plurality of events are displayed;
displaying a timeline of events of the individual, the timeline of events showing all events the individual has attended over a predetermined timeframe, wherein the events are displayed in chronological order, each event showing an event summary having a brief description of the event and a picture associated with the event; and
displaying an album button for each of the events displayed on the timeline of events, the album button for each of the events displaying image files from that specific event loaded by the individual and invitees to that specific event, wherein an upload button in the photo album allowing the individual and invitees to upload the image files to the photo album.

16. The computing device of claim 15, wherein the memory storing program instructions that when executed by the processor, causes the processor to:
attach reminder photo or reminder video to the reminder; and
display the reminder photo or reminder video when the reminder bubble is selected, wherein the reminder photo or reminder video is deleted after a predetermined amount of time after the reminder photo or reminder video is viewed.

17. The computing device of claim 15, wherein the memory storing program instructions that when executed by the processor, causes the processor to display a detail event page, wherein the detail event page shows each invitee and a status indicator of each invitee, the status indicator showing if each invitee has accepted, rejected or check-in to the event.

18. The computing device of claim 15, wherein the memory storing program instructions that when executed by the processor, causes the processor to display a secret message notification on the event page, the secret message notification indicating that a person in a contact list of a receiving party of the secret message notification has sent an anonymous message, wherein pressing the secret message notification displays the anonymous message.

19. The computing device of claim 15, wherein the memory storing program instructions that when executed by the processor, causes the processor to:
display a direct message button approximate each person in a contact list of the individual, the direct message button approximate each person in a contact list of the individual allowing the individual to directly text the selected person through the social platform; and
display a chat page, wherein the chat page allowing the individual to chat with one or more people in the contact list of the individual through the social platform.

* * * * *